Oct. 10, 1933.  H. L. BLOOD  1,929,966
GAUGE MECHANISM FOR GRINDING MACHINES AND THE LIKE
Filed Dec. 7, 1931  2 Sheets-Sheet 1

Inventor
Harold L. Blood
By Geo. H. Kennedy Jr.
Attorney

Oct. 10, 1933.    H. L. BLOOD    1,929,966
GAUGE MECHANISM FOR GRINDING MACHINES AND THE LIKE
Filed Dec. 7, 1931    2 Sheets-Sheet 2

Inventor
Harold L. Blood
By Geo. H. Kennedy Jr.
Attorney

Patented Oct. 10, 1933

1,929,966

UNITED STATES PATENT OFFICE 1,929,966

GAUGE MECHANISM FOR GRINDING MACHINES AND THE LIKE

Harold L. Blood, Worcester, Mass., assignor to The Heald Machine Company, Worcester, Mass., a corporation of Massachusetts Application December 7, 1931. Serial No. 579,438

11 Claims. (Cl. 51—165)

The present invention relates to the gauging mechanism of grinding machines, said mechanism operating automatically to determine the size of a workpiece during the grinding operation.

In a machine of the type shown in the Kempton and Gallimore Patent No. 1,731,719 issued October 15, 1929, the workhead carries a gauge mounted on the inner end of a draw rod which extends axially through the hollow spindle in said workhead, said spindle carrying on the end thereof a workholding member in which a workpiece is mounted. The gauge is arranged to contact the workpiece and when the workpiece reaches a predetermined size to enter the bore thereof, and is periodically withdrawn from the workpiece and returned into engagement therewith during the grinding cycle in response to the reciprocatory movements of the carriage supporting the grinding wheel, said withdrawal movement preventing contact between the gauge and the grinding wheel as the latter is reciprocated over the surface of the workpiece. In this type of machine the grinding wheel is rapidly reciprocated and since the gauge is directly actuated by the movements of the carriage on which the grinding wheel is mounted, said gauge is moved into contact with the workpiece at the rapid rate of travel of the carriage. The gauge is thus subjected to a severe hammering action as a result of the repeated contacts between the gauge and the workpiece, and the hammering action rapidly destroys the accurate surfaces of the gauge, making necessary frequent inspection and replacement of the gauge to maintain the surfaces of the gauge at the proper gauging size.

Furthermore, the sudden engagement between the workpiece and the moving gauge results in a severe end pressure on the workpiece which tends to force the workpiece out of the chuck or holding means in the workhead. This has been overcome by special chucks, the jaws of which engage the outer flat surface of the workpiece and are held in clamping position by heavy springs which oppose the pressure of the gauge, or by a very secure clamping of the ordinary chuck, with periphery engaging jaws. The special chucks are expensive and complex in operation since the workpiece must be centered as well as clamped, and if the ordinary chuck is used the pressure of the jaws is often sufficient to distort the work during the grinding, especially in thin walled pieces, so that the finished workpiece is not perfectly cylindrical. It is accordingly the principal object of the present invention to provide a gauge movement such that the gauge is brought into contact with the workpiece at a slow rate of speed, thereby avoiding the above disadvantages, without losing any of the advantage of the gauge controlled machine.

According to the present invention, the gauge is reciprocated in the usual manner in response to the movement of the carriage carrying the grinding wheel, a mechanism being incorporated in the connections between the table and the gauge mechanism such that the rate of travel of the gauge as it approaches the workpiece is greatly diminished and the gauge comes in contact with the workpiece at a relatively slow rate.

The above and other objects and advantages will be apparent from the following detailed description taken in connection with the accompanying drawings, in which:—

Like reference characters refer to like parts in the different figures.

Figure 1:
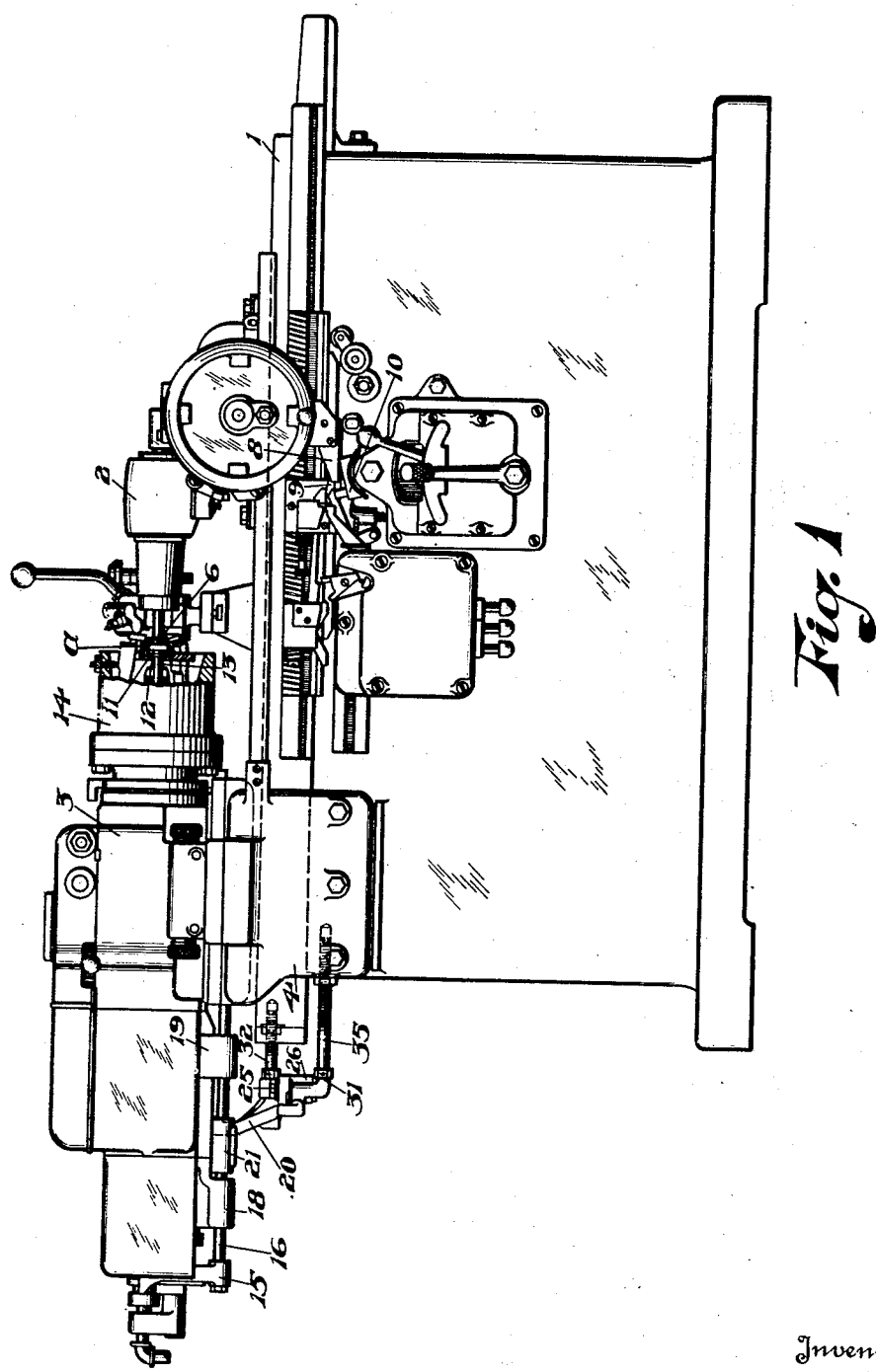
Fig. 1 is a front elevational view of a grinding machine embodying the invention.
Figure 5:
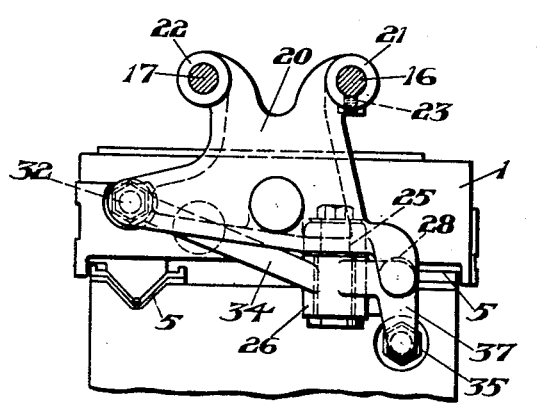
Fig. 5 is an end view of the portion of the actuating mechanism shown in Figs. 3 and 4.

Referring first to Fig. 1, the machine provides the usual reciprocatory table or carriage 1, which is provided in an internal grinding machine. Either the grinding wheel or the workpiece to be ground may be carried on the table 1, the reciprocations of the latter operating in either case to procure a relative traversing movement between the grinding wheel and the workpiece. As here shown, the table 1 supports and carries a wheel head 2, and the work to be operated upon is supported by a workhead 3, the latter being carried by a bridge 4 which spans the slideways 5, Fig. 5, provided by the machine frame for the back and forth movement of the table 1.

The back and forth movement of the table 1 which causes the rotating grinding wheel 6 to make the required interior traverse of the rotating workpiece a may be imparted in any well known manner, as by the use of the fluid pressure controlling and reversing mechanism disclosed in Patent No. 1,582,468 granted April 27, 1926 to Heald and Guild. Such mechanism forms no part of the present invention; it is sufficient to note that the driving means employed procures the reversal of said table at each end of the normal working stroke by the use of spaced adjustable dogs 8 and 9 carried by the table 1, which dogs are adapted alternately to engage and to move a reversing member 10, the latter during the grinding operation being situated between the two dogs 8 and 9 in position to be engaged thereby; said member 10, by its consequent movement, procures the reversals of the table.

Figure 2:
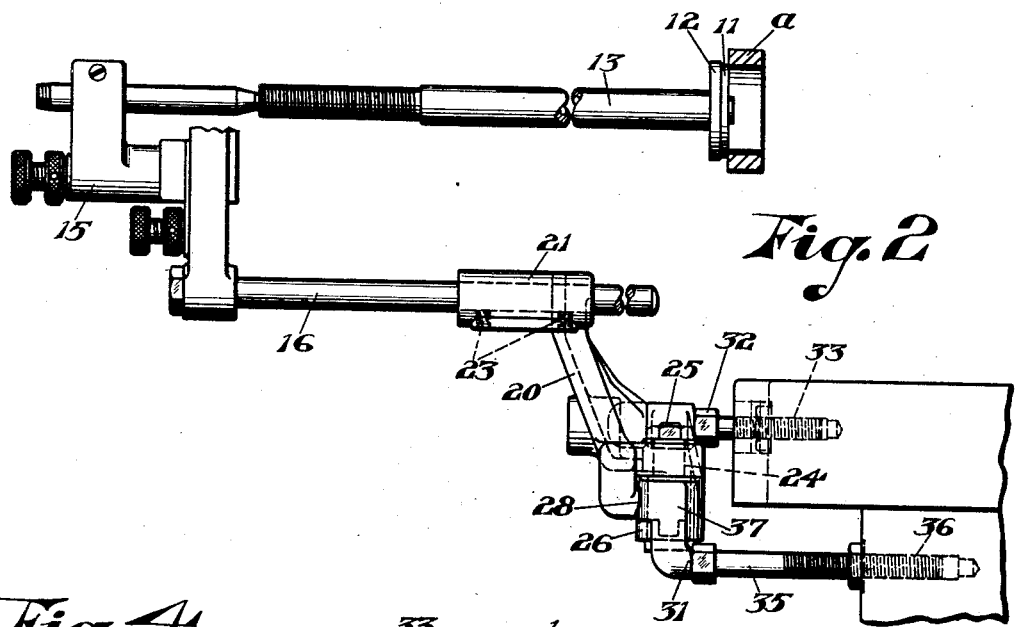
Fig. 2 is a fragmentary elevational view showing the gauge and actuating mechanism in position on the machine, the workhead having been omitted.

The grinding operation is under the control of a gauge mechanism which operates, for example, as disclosed in the above cited Kempton and Gallimore patent, to procure separation of the grinding wheel from the workpiece during the progress of the grinding operation, in response to entry of a roughing gauge within the bore of the workpiece, said separation permitting a dressing operation to be performed on the grinding wheel. Following the dressing operation, the grinding wheel having been automatically returned to grinding position relative to the workpiece, a second or finish gauge procures another separation of the grinding wheel from the workpiece just as the latter reaches predetermined finished size. The mechanism by which the grinding operation is controlled in response to operation of the gauge mechanism is fully disclosed in the said patent and is not described herein; it is sufficient to note that a pair of gauges 11, 12 are provided for entry within the bore of a workpiece $a$, Fig. 2, during the progress of the grinding operation. The roughing gauge 11 enters the bore of the workpiece prior to the completion of the grinding operation, the entry of said gauge operating to vary the normal reciprocations of the carriage in any desired manner, and the finish gauge, after the grinding operation has continued, following entry of the roughing gauge, subsequently enters the bore of the workpiece to bring the grinding operation to a close.

The various controlling mechanisms for the grinding operation are all old and well known and of themselves form no part of the present invention. The latter involves the attainment, in connection with such or similar control mechanisms, of the novel objects and results hereinbefore set forth. According to the present invention, the roughing and finish gauges 11 and 12 are mounted on the inner right hand end of a gauge rod 13 which is axially slidable in the spindle, not shown, rotatably mounted in the workhead 3, said spindle having a workholding member 14 on the inner end thereof, in which a workpiece $a$ is mounted, the gauges 11 and 12 being normally urged to the right by a heavy spring, not shown, into engagement with said workpiece, for entry in the bore thereof when said workpiece is ground to the size of said gauges. The outer or left hand end of the gauge rod 13 projects beyond the end of the spindle, Fig. 1, and a depending connecting member 15 is securely fastened to the projecting end of said rod. The lower end of the connecting member is provided with spaced parallel bores for the reciprocation of spaced parallel rods 16 and 17 secured against movement in said member, said rods being slidably mounted in parallel relation to the gauge rod in horizontal bearings 18 and 19, Fig. 1, on the under side of the workhead. The connecting member 15 being secured against movement relative to the gauge rod and to the parallel rods provides a connection between said gauge rod 13 and the rods 16 and 17 such that all of said rods 13, 16 and 17 move as a unit. The rods 16 and 17 are reciprocated periodically in response to the movements of the table 1, as will hereinafter appear, and accordingly procure reciprocation of the gauge rod 13, which operates to withdraw the gauges from contact with the workpiece and to cause said gauges to return into engagement with the workpiece.

Figure 4:
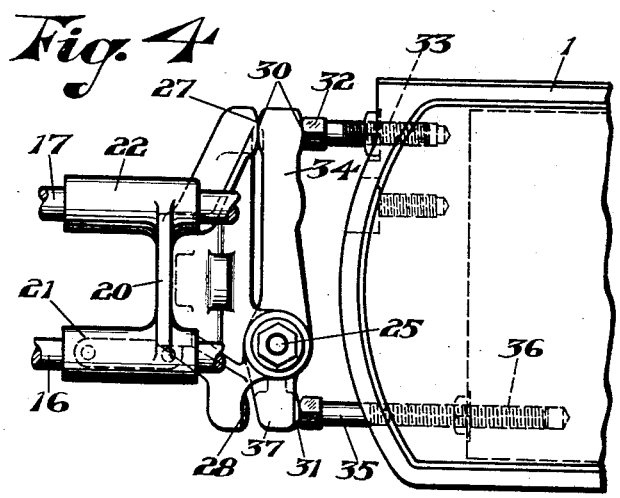
Fig. 4 is a plan view corresponding to Fig. 3, the reciprocating carriage being between the ends of stroke.
Figure 3:
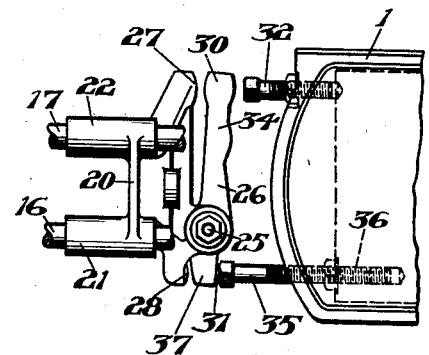
Fig. 3 is a plan view of a portion of the actuating mechanism for the gage, the reciprocating carriage being at the right hand end of stroke.

As best shown in Figs. 3 and 4, a bracket 20 provides spaced bearing portions 21 and 22 which receive the rods 16 and 17, said bracket being secured against movement on said rods by set screws 23. The depending portion of the bracket 20 provides a vertical bore 24 which receives a bolt 25, the latter providing a vertical pivotal support for a rocking lever 26 through which the movements of the gauges are procured. The bracket is provided with spaced lugs 27 and 28 which are in alignment with and correspond in spacing to the opposite enlarged ends 30 and 31 of the rocking lever 26, and a bolt 32, which is mounted in a threaded bore 33 in the left hand end of the table 1, has its head in alignment with the enlarged end 30 on the long arm 34 of the rocking lever.

As the carriage moves to the left, the bolt 32 engages and actuates the rocking lever 26 until the end 30 engages the lug 27 on the bracket, when the bracket 20 is actuated directly by the carriage to procure movement of the gauges to the left, out of contact with the workpiece. Said gauges are moved to the left directly in response to the carriage movement, and are urged to the right as the carriage moves to the right by the heavy coil spring above noted, which maintains the end 30 of the rocking lever in contact with the bolt 32 at all times, except as will be pointed out hereinafter.

As above pointed out, as the gauges are returned into contact with the work in response to movement of the carriage to the right, the rate of movement of said gauge is diminished as the gauge aproaches the workpiece to avoid the sudden contact between the gauge and the workpiece. This diminished rate of movement involves movement of the rocking lever 26 relative to the bracket 20 said relative movement permitting the rate of movement of the gauge members to be diminished, the gauges, however, being still actuated and controlled by the movements of the table. Referring again to Figs. 3 and 4, a bolt 35, which is mounted in a threaded bore 36 in the base of the machine, projects to the left, with the head of said bolt in alignment with the enlarged end 31 on the short arm 37 of the rocking lever. The arm 34 of the rocking lever 26 is substantially longer than the arm 37, in the construction shown, (the ratio illustrated in the drawings being substantially three to one) to procure the desired decrease in rate of travel of the gauges as the latter are moved into contact with the workpiece.

When the carriage is in the position shown in Fig. 3, said carriage being at the right hand end of its reciprocatory movement, the gauges are in contact with the surface of the workpiece, and the rocking lever is in a position between its extreme positions, neither the end 30 nor the arm 37 contacting with the lugs 27 or 28, the end 31 being in contact with the bolt 35, and the end of the bolt 32 being spaced from the end 30 of the lever 26.

It will be apparent that, when the workpiece is reduced to finished size, the gauge will move to the right to enter the bore of the workpiece, said distance being at least as great as the thickness of both said gauges. This movement involves similar movement of the bracket 20 to the right beyond the position of Fig. 3, and since the end 31 of the rocking lever is in contact with the bolt 35, this gauge movement involves rocking movement of the lever 26 on its pivot, carrying the end 30 of the lever to the right a distance greater than the thickness of the gauges in proportion to the lengths of the arms of the lever. This ratio being three to one in the present construction, the spacing of bolt 32 from the enlarged end 30 must be at least three times the thickness of the gauges in order to permit both said gauges to enter the bore of the workpieces at the end of the grinding operation.

From the position of Fig. 3, the carriage moves to the left, during its normal reciprocatory stroke, during which movement the bolt 32 engages the end 30 of the rocking lever, urging said end 30 to the left, thereby rocking the lever counterclockwise about its pivotal axis. The end 31 of the lever is held against movement to the right, the bolt 35 being in engagement with said end 31, the pivotal point of the lever, and accordingly the bracket 20 and gauges 11 and 12 are moved to the left with the carriage but at a proportionately lower rate of travel, the proportion being the ratio of the length of the arms of the lever. Continued movement of the carriage to the left brings the end 30 of the lever into engagement with the lug 27 on the bracket (the position of Fig. 4), and the bracket and gauges are then moved to the left at the same rate of travel as the table, the gauge being thus withdrawn to the left out of contact with the workpiece.

As the carriage is reversed at the left hand end of its reciprocatory stroke, and begins its right hand movement, the gauge moves to the right therewith at the same rate of travel, until, as the gauge approaches the workpiece, the parts reach the position of Fig. 4, the bolt 35 at this point engaging the enlarged end 31 of the lever 26. Continued right hand carriage movement involves counterclockwise rotation of the lever 26, the end 31 now being held fixed, and the rate of travel of the gauge is diminished to a lower rate, the proportionate rate of travel of the gauge and the carriage corresponding, as above stated, to the ratio of the lengths of the arms of the lever 26. As the gauge is spaced from the workpiece when the diminished rate of travel is inaugurated, said gauge contacts the work at a relatively low rate of speed as compared to that of the carriage, as above pointed out. Continued movement of the carriage to its right hand end of movement, after the gauge contacts the end of the workpiece, procures separation of the bolt 32 from the end 30 of the lever, to permit further movement of the gauges to the right for entry within the bore of the workpiece when said workpiece reaches desired size.

From a consideration of Fig. 3, it will be noted that the arm 37 is normally spaced from the lug 28 on the bracket, to allow further clockwise rocking movement of the lever 26 as the gauges enter the workpiece. Entry of both the gauges, however, rocks the lever clockwise until the lug 28 contacts the arm 37, this engagement occurring after the finish gauge 12 has entered the bore of the workpiece and preventing further right hand movement of the gauges and the associated parts.

From the foregoing, it will be apparent that the gauge is withdrawn from the workpiece and returned into contact therewith in response to the movements of the reciprocating carriage which procures the relative traverse between the grinding wheel and the workpiece and that, as the gauge approaches the workpiece, the rate of movement of said gauge is diminished relative to the carriage movement so that the gauge is moved into contact with the workpiece at a slow rate of speed.

I claim:

1. In apparatus of the class described, a workholding member, a gauge, means to reciprocate said gauge to urge said gauge periodically into contact with a workpiece in said workholding member adjacent one end of the reciprocatory stroke of said gauge, and means to diminish the rate of movement of said gauge during each reciprocatory stroke as the latter approaches, and comes into contact with the workpiece.

2. In apparatus of the class described, a workholding member, a gauge normally in contact with one end of a workpiece in said workholding member, means to withdraw said gauge periodically from said workpiece and to return said gauge into contact with said workpiece, and means to diminish the rate of return movement of said gauge during each reciprocatory stroke as the latter approaches, and comes into contact with, said workpiece.

3. An apparatus of the class described, a workholding member, a gauge, a reciprocating member, means responsive to movement of said reciprocating member to procure reciprocation of said gauge into and out of engagement with a workpiece in said workholding member, and means to slow down the rate of movement of said gauge relative to the movement of said reciprocating member as said gauge approaches, and comes into contact with, the workpiece during each reciprocation of said gauge.

4. In a grinding machine, a grinding wheel and a work-supporting member, a gauge normally contacting one end of a workpiece in said work-supporting member, means to procure reciprocation of said gauge to withdraw said gauge periodically from said workpiece as said grinding wheel approaches said end of the workpiece, and means to decrease the rate of travel of said gauge as the latter approaches the workpiece on the return stroke of said gauge.

5. In a grinding machine, a grinding wheel and a workpiece, reciprocating means to procure a reciprocating travel of said wheel over the surface of the workpiece, a gauge normally in contact with said workpiece, means responsive to said first-mentioned means to procure reciprocation of said gauge to withdraw said gauge periodically from the workpiece, and means to procure engagement of said gauge with the workpiece on the return stroke at a slow rate of travel relative to the rate of travel of the reciprocating means.

6. In a grinding machine, a grinding wheel and a work-supporting member, reciprocatory means to procure a reciprocatory traverse of said grinding wheel over the surface of a workpiece in said work-supporting member, a gauge reciprocated by said means into periodical engagement with the workpiece, and means to procure engagement between the gauge and the workpiece at a slow rate of travel relative to the rate of travel of said reciprocatory means.

7. In a grinding machine, a grinding member and a work-supporting member, a reciprocatory carriage carrying one of said members to procure a relative reciprocation of the grinding member over the surface of a workpiece in said work-supporting member, a gauge reciprocated in response to the carriage movement into and out of engagement with the workpiece, and means to procure a decrease in the rate of travel of said gauge as the latter approaches, and comes into contact with said workpiece.

8. In a grinding machine, a grinding member and a work-supporting member, a reciprocatory carriage carrying one of said members to procure a relative reciprocation of the grinding member over the surface of a workpiece in said work-supporting member, a gauge reciprocated in response to said carriage movement into and out of engagement with said workpiece, and means to decrease the rate of travel of said gauge during a portion of said reciprocatory stroke whereby said gauge is traveling at a slow rate of travel relative to the rate of travel of the carriage as said gauge is brought into contact with the workpiece.

9. In a grinding machine, a grinding member and a work-supporting member, a reciprocatory carriage carrying one of said members to procure a relative reciprocation of the grinding wheel over the surface of a workpiece in said work-supporting member, a gauge reciprocated in response to said carriage movement into and out of engagement with said workpiece, and means to procure movement of said gauge at a rate of travel slower than the rate of travel of said carriage during at least a portion of the gauge movement during each reciprocation of said gauge.

10. In apparatus of the class described, a work-supporting member, a gauge, a reciprocating member, means actuated in response to the movements of said reciprocating member to procure reciprocation of said gauge into and out of engagement with a workpiece in said work-supporting member, and means to slow down the rate of movement of said gauge relative to the movement of said reciprocating member as said gauge approaches and comes into contact with the workpiece during each reciprocation, said last-mentioned means comprising mechanism movable with said gauge and a pivotally mounted lever carried by said mechanism, one end of said lever being positioned for engagement with a portion of said reciprocating member and the other end of said lever engageable with a fixed support for procuring, by rocking of said lever on said mechanism, a reduction in the rate of travel of said gauge.

11. In a grinding machine, a grinding member and a work-supporting member, a reciprocatory carriage carrying one of said members to procure a relative reciprocation of the grinding member over the surface of a workpiece in said work-supporting member, a gauge reciprocated in response to said carriage movement into and out of engagement with said workpiece, and means to procure movement of said gauge at a rate of travel slower than the rate of travel of said carriage during at least a portion of the gauge movement, said last-mentioned means comprising mechanism movable with said gauge and a pivotally mounted lever carried by said mechanism, one end of said lever being positioned for engagement with a portion of said carriage and the other end of said lever engageable with a fixed support for procuring, by rocking of said lever on said mechanism, a reduction in the rate of travel of said gauge.

HAROLD L. BLOOD.